Figure 1:
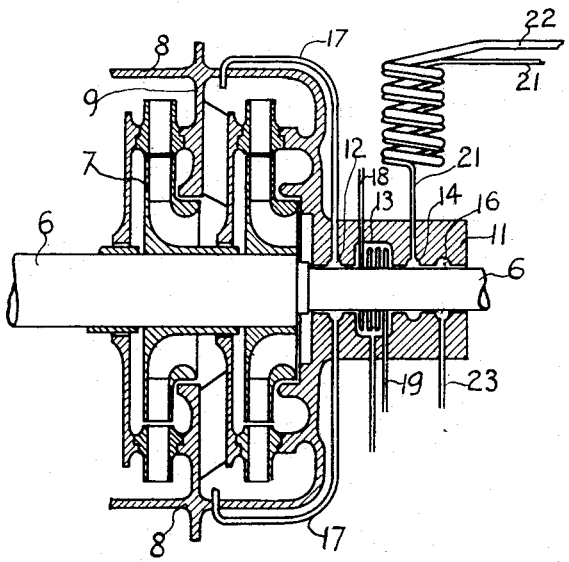

Oct. 31, 1933.  W. VAN RIJSWIJK  1,932,995
METHOD FOR IMPROVING THE SEALING ACTION OF FLUID SEALED GLANDS

Filed July 12, 1929

Inventor
Willem Van Rijswijk
By Alfred H. Dyson
Attorney.

Patented Oct. 31, 1933

1,932,995

UNITED STATES PATENT OFFICE 1,932,995

METHOD FOR IMPROVING THE SEALING ACTION OF FLUID SEALED GLANDS

Willem van Rijswijk, Baden, Switzerland, assignor to Aktiengesellschaft Brown Boveri & Cie., Baden, Switzerland, a joint-stock company of Switzerland Application July 12, 1929, Serial No. 377,826, and in Germany, July 14, 1928

4 Claims. (Cl. 286—19)

This invention relates to methods for improving the sealing action of fluid sealed packing glands and, especially, for such glands as are arranged to seal the shaft of a rotary machine dealing with fluids.

Fluid sealed packing glands are very desirable as a means for sealing the apertures through which a rotating member extends from the interior of a casing containing a high pressure fluid for the reason that a most efficient seal may be obtained without materially reducing the available power of the machine due to friction of packing on the shaft. The amount of gas absorbed or dissolved by a liquid depends on the pressure and temperature relations of the gas and the liquid. For example, if the pressure remains constant and the temperature increases, the amount of gas diffused into the liquid will decrease and if the pressure-temperature relations are reversed, the opposite effect will occur. If both pressure and temperature relations are simultaneously varied, the amount of gases diffused into a liquid will vary as the product of the pressure and the temperature. Stated in other words, heating a liquid in contact with a gas at constant pressure prevents absorption of the gas into the liquid and cooling a liquid at constant pressure in contact with a gas permits such absorption.

In fluid sealed packing glands, it is desirable to maintain such sealing action as will prevent loss of the operating medium, hereinafter called gas, by which is meant any substantially compressible vapor or fluid, or to prevent the entrance of air thereinto. Neither of the above desired results can be obtained in a fluid sealed packing gland in which the gas flows away from the casing and the sealing medium flows toward the casing so that the fluids meet and mingle at some point within the space to be sealed. Failure to attain the desired result is due to the mutual diffusion of the one fluid into the other by reason of which the gas diffusing into the sealing medium is lost to the atmosphere and a portion of the gas returning to the casing is contaminated.

It is, therefore, among the objects of the present invention to provide a method and means, for carrying out the method, for decreasing the amount of diffusion and, accordingly, for decreasing the amount of loss and of contamination of the operating medium or gas.

Another object of the invention is to control the temperature relations between the gas and the sealing medium in such manner that the amount of mutual diffusion of the two mediums will be decreased.

Objects and advantages, other than those above set forth, will be apparent from the following description and the drawing, in which Figure 1 is a partial cross-sectional view of a rotary machine for handling fluids which illustrates how the method may be performed according to the present invention.

Figure 2:
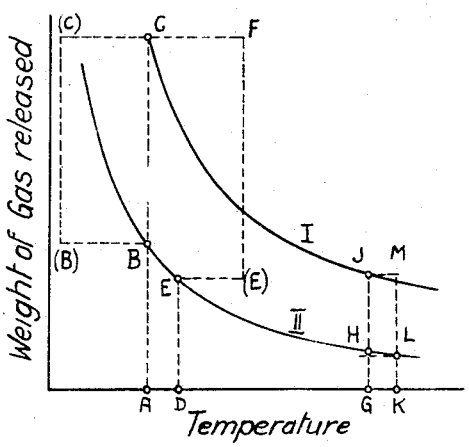
Figure 3:
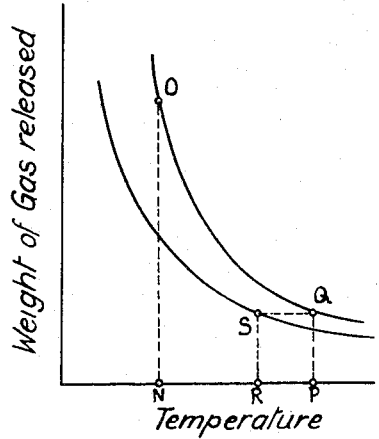

Fig. 2 shows several curves which illustrate the results to be attained by the present invention, and Fig. 3 is a diagram similar to that shown in Fig. 2 showing the results to be obtained by a modification of the method.

Referring more particularly to the drawing by characters of reference, reference numeral 6 indicates a shaft having one or more impeller wheels 7 secured thereon. The shaft and the wheels are enclosed within a suitable casing 8 and, if more than one wheel is present, the wheels are separated by casing portions 9. An extension 11 of casing 8 is arranged to provide a bearing for shaft 6 and to include the structure of a fluid sealed packing gland to be hereinafter described. The extension 11 is provided with a plurality of cavities 12, 13, 14 and 16 of such size as to be adapted best to the nature of the gas and the sealing medium to be handled. A tubular connection 17 is made between points of relatively high pressure within casing 8 and with cavity 12 of the sealing gland. Cavity 13 of the sealing gland is arranged to receive a heating coil 18 and may be provided with a discharge connection 19 to the atmosphere, to a separate reservoir, or back to the casing.

A source of sealing medium (not shown) is connected with cavity 14 by a sealing medium supply connection 21 which is coiled adjacent the casing 8 in such manner that a cooling coil 22 may be arranged closely adjacent to the coil of the sealing medium supply connection. Cavity 16 is provided with a discharge conduit 23 which may lead to the atmosphere or to a reservoir (not shown) for the sealing medium.

During operation, the gas flows from casing 8 through tubular connection 17 into cavity 12 from which it flows in both directions along shaft 6 toward the interior of casing 8 and toward cavity 13. The sealing medium is supplied from the reservoir (not shown), through connection 21, to cavity 14 from which it flows toward 13 and toward cavity 16. The gas and the sealing medium meet and mingle in cavity 13 where they are heated by contact with heating coil 18, which is heated by circulation of a heating medium therethrough. The solubility of the gas in the sealing medium is accordingly decreased and the amount of gas diffused thereinto and lost is decreased by the same amount. The sealing medium flowing outwardly toward the atmosphere may be collected in cavity 16 and discharged therefrom by discharge connection 23 to waste or to a sealing medium supply reservoir (not shown).

The pressure and temperature relations to be obtained between the sealing medium and the gas may best be understood by a restatement of the basic principles governing diffusion or absorption of a gas into a sealing medium which is usually a liquid. So long as the pressure remains constant, heating of the sealing medium prevents the absorption or diffusion of gas thereinto. Cooling of the sealing medium has the effect of permitting the diffusion or absorption of gas into the sealing medium.

If the temperature remains constant and the pressure is varied, a decrease in pressure will prevent diffusion or absorption of the gas into the sealing medium while increased pressure will permit or force such absorption or diffusion of the gas into the sealing medium in contact therewith. As hereinbefore stated, the amount of mutual diffusion or absorption of gas and sealing medium is a function of the product of pressure and the temperature if both pressure and temperature vary.

Attention is now directed to Fig. 2 of the drawing, the curves there shown graphically illustrating the volume relations of a gas, which curves are plotted on an ordinate axis of the weight of gas released and an abscissa axis of temperature. Curve I indicates the relations of a gas under high pressure at constant volume and Curve II indicates the volume of a gas at lower pressure. If a constant temperature is taken at the point A, a decrease of pressure from compressor to atmospheric pressure, i. e., from Curve I to Curve II, will permit liberation of gas from the sealing medium in the amount indicated by the line B—C. If the temperature of the sealing medium only is increased, while the temperature of the gas in the compressor is unaffected, by the amount A—D and the pressure of the sealing medium is constant atmospheric pressure, the amount of gas diffused into the sealing medium will be indicated by the line E—F. It will thus be seen that a small increase in temperature of the sealing medium under atmospheric pressure produces a relatively large decrease in the amount of the gas capable of being diffused thereinto.

For the purposes of comparison, a similar set of temperatures is taken at a higher range in which, at the temperature G, the amount of gas diffused into the sealing medium by a decrease of pressure from compressor to atmospheric pressure is indicated by the line H—J. If the temperature of the liquid is now increased by the amount G—K, which is an amount equal to A—D, the amount of gas diffused into the sealing medium at atmospheric pressure is indicated by the line L—M. It will thus be seen that, at the higher temperature G, an increase in temperature equal to A—D produces a relatively small decrease in the amount of gas diffused into the sealing medium.

For the purpose of the present invention, the temperature G is accordingly termed the controlling temperature. It will be understood that the controlling temperature varies with each variation in the combination of the sealing medium and the gas.

If the sealing medium is heated at atmospheric pressure, that is, at temperature D and pressure E after having been in contact with the gas at a lower temperature A and higher pressure C, a large amount of the gas will be diffused thereinto. If the sealing medium is heated while in contact with the gas at high pressure and then is brought to low pressure as at L, an inconsiderable amount of gas will be diffused thereinto. The controlling point in the temperature relations of the sealing medium and the gas is accordingly reached when the sealing medium approaches saturation at room temperature and atmospheric pressure so that even a substantial increase of temperature will not produce any material decrease in the amount of gas diffused into the sealing medium. Heating the sealing medium to the controlling temperature in contact with the gas therefore prevents such saturation of the sealing medium as will permit material losses of the gas when the liquid passes from the compressor pressure in the sealing gland to atmospheric pressure exteriorly thereof.

If even greater economy in the amount of gas escaping is desired, the sealing medium may be cooled from the controlling temperature to such temperature that upon release from compressor to atmospheric pressure the sealing medium will be unsaturated and accordingly no gas will escape therefrom.

Fig. 3 illustrates the relations of the sealing medium and the gas when the sealing medium is cooled from the controlling temperature P to the temperature R which is so chosen that the lines which indicate the amount of gas liberated from the sealing medium at the different temperatures, namely lines P—Q and R—S, were exactly equal. Lines P—Q and R—S being equal, it is evident that no escape of gas from the sealing medium is possible even though the pressure on the sealing medium is reduced, from that shown by the curve O—Q to that of the curve having the point S. Further reduction of pressures, however, results in separation of the gas and sealing medium.

If the machine is operated below atmospheric pressure, so that it is desirable to exclude air therefrom, the sealing medium may first be heated at atmospheric pressure to exclude any air diffused thereinto and may then be cooled out of contact with the atmosphere before entrance into the sealing gland so that the sealing medium is not saturated with air. It is accordingly impossible for any air, under the above conditions, to diffuse from the sealing medium into the gas which is below atmospheric pressure.

Although only a few embodiments of this invention have been illustrated and described, it will be understood that various other embodiments are possible, and that various changes may be made without departing from the spirit of the invention or the scope of the claims.

The invention claimed is:

1. In a method for improving the sealing of the fluid sealed portions of machines handling fluids, the steps of supplying a flow of gas to the machine portion to be sealed at a point adjacent the casing of the machine, supplying a flow of sealing medium to the machine portion to be sealed at a point beyond the point of supply of the gas, and heating the gas and the sealing medium at the point of contact intermediate the point of supply of the gas and of the sealing medium to decrease the solubility of the gas in the sealing medium.

2. In a method for improving the sealing of the sealed portions of machines handling fluids, the steps of supplying a flow of gas under pressure to the machine portion to be sealed, supplying a sealing medium to the machine portion to be sealed in such manner as to contact with said gas, and elevating the temperature of the sealing medium at the point of contact thereof with said gas to such degree with respect to the pressure of said gas as to diminish the gas absorption capacity of said medium.

3. In a method for improving the sealing of the sealed portions of machines handling fluids, the steps of supplying a gas to the machine portion to be sealed at a point adjacent the casing of the machine, supplying a flow of sealing medium to the machine portion to be sealed at a point beyond the point of supply of gas thereto, cooling the sealing medium to increase the gas absorption capacity thereof before admission to the machine portion to be sealed, causing a portion of said medium to flow towards the point of supply of and into contact with said gas and a portion to flow in direction away from the point of supply of said gas and out of contact therewith, elevating the temperature of said portion of the sealing medium flowing into contact with said gas with respect to the pressure thereof to diminish the gas absorption capacity of such portion of the sealing medium, and causing the respective said portions of the sealing medium to flow from said machine portion by way of separate paths.

4. In a method for improving the sealing of the sealed portions of machines handling fluids, the steps of supplying a flow of gas to the machine portion to be sealed, supplying a flow of sealing medium to the machine portion to be sealed, and heating the sealing medium to establish such temperature relations of the gas and the sealing medium as to diminish the amount of mutual diffusion therebetween.

WILLEM van RIJSWIJK.